(12) United States Patent
Zelesky (10) Patent No.: US 10,393,023 B2
(45) Date of Patent: Aug. 27, 2019

(54) TANGENTIAL ON-BOARD INJECTORS FOR GAS TURBINE ENGINES

(71) Applicant: United Technologies Corporation, Farmington, CT (US)

(72) Inventor: Mark F. Zelesky, Bolton, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 326 days.

(21) Appl. No.: 14/860,156

(22) Filed: Sep. 21, 2015

(65) Prior Publication Data

US 2017/0082026 A1   Mar. 23, 2017

(51) Int. Cl.
*F02C 7/18* (2006.01)
*F01D 5/08* (2006.01)

(52) U.S. Cl.
CPC .............. *F02C 7/18* (2013.01); *F01D 5/082* (2013.01); *F05D 2220/32* (2013.01); *F05D 2260/232* (2013.01); *F05D 2260/607* (2013.01)

(58) Field of Classification Search
CPC .. F01D 25/32; F01D 5/082; F02C 7/18; F02C 7/052
See application file for complete search history.

(56) References Cited

U.S. PATENT DOCUMENTS

| 4,617,028 A * | 10/1986 | Ray ..................... F02C 7/05 55/306 |
| 4,820,116 A | 4/1989 | Hovan et al. |
| 2012/0057967 A1 | 3/2012 | Laurello et al. |
| 2016/0123154 A1* | 5/2016 | Manning ................. F01D 5/147 416/90 R |

FOREIGN PATENT DOCUMENTS

| DE | 102004061173 A1 | 7/2006 |
| EP | 3015681 | 5/2016 |

OTHER PUBLICATIONS

European Search Report, European Application No. 16189892.9, dated Jan. 24, 2017, European Patent Office; European Search Report 8 pages.

* cited by examiner

*Primary Examiner* — Jason D Shanske
*Assistant Examiner* — John S Hunter, Jr.
(74) *Attorney, Agent, or Firm* — Cantor Colburn LLP (57) ABSTRACT

A tangential on-board injector for a gas turbine engine is provided. The tangential on-board injector includes a body having an entrance and an exit, the body having a curved shape and defining an air passageway between the entrance and the exit and an inlet extension connected to the entrance of the body, the inlet extension extending from the body and having an inlet configured to force air to change direction when entering the inlet of the inlet extension.

13 Claims, 8 Drawing Sheets

TANGENTIAL ON-BOARD INJECTORS FOR GAS TURBINE ENGINES

BACKGROUND

The subject matter disclosed herein generally relates to gas turbine engines and, more particularly, to tangential on-board injectors ("TOBI").

Gas turbine engines may have particle accumulation therein, e.g., sand, dust, etc. The accumulation of such particles may lead to durability distress due and/or other impacts may result. One result of particle accumulation may be holes within the engine may plug or clog due to a build-up of particles within the hole.

Small particles may not get rejected in the fan and compressor stages of the engine, and thus may be present in the secondary flow system of the engine. One point of particle accumulation may be proximal and/or in the tangential on-board injector ("TOBI"). Particles in the lower part of the engine may fall and/or collect near the TOBI due to gravity, and may collect near the TOBI entrance. Further, any particles that enter the TOBI may be fed and supplied to the blade and feed the forward leak with the particle-rich air. Thus, it may be advantageous to design a TOBI having an ability to prevent particles from being supplied therethrough.

SUMMARY

According to one embodiment, a tangential on-board injector for a gas turbine engine is provided. The tangential on-board injector includes a body having an entrance and an exit, the body having a curved shape and defining an air passageway between the entrance and the exit and an inlet extension connected to the entrance of the body, the inlet extension extending from the body and having an inlet configured to force air to change direction when entering the inlet of the inlet extension.

In addition to one or more of the features described above, or as an alternative, further embodiments may include that the inlet extension is configured to direct air through an angle as the air flows through the inlet extension.

In addition to one or more of the features described above, or as an alternative, further embodiments may include that the angle is equal to or greater than 90°.

In addition to one or more of the features described above, or as an alternative, further embodiments may include that the inlet extension is integrally formed with the body.

In addition to one or more of the features described above, or as an alternative, further embodiments may include a purge cavity configured along the air passageway of the body, the purge cavity configured such that large particles in an airflow through the passageway will enter the purge cavity.

In addition to one or more of the features described above, or as an alternative, further embodiments may include that the purge cavity is configured to expel particles from the purge cavity to an annular cavity external to the body.

In addition to one or more of the features described above, or as an alternative, further embodiments may include a separator located at the exit of the body, the separator configured to separate an airflow flowing through the air passageway into a first flow path and a second flow path.

In addition to one or more of the features described above, or as an alternative, further embodiments may include that the first flow path is directed inboard relative to the body and the first flow path is directed outboard relative to the body.

In addition to one or more of the features described above, or as an alternative, further embodiments may include that each of the first flow path and the second flow path are configured to direct air to cool components of a gas turbine engine.

According to another embodiment, a method of manufacturing a gas turbine engine having a tangential on-board injector is provided. The method includes installing an inlet extension to an entrance of a body of the tangential on-board injector, the inlet extension extending from the entrance and having an inlet configured to force air to change direction when entering the inlet of the inlet extension.

In addition to one or more of the features described above, or as an alternative, further embodiments of the method may include that the inlet extension is configured to direct air through an angle as the air flows through the inlet extension.

In addition to one or more of the features described above, or as an alternative, further embodiments of the method may include that the angle is equal to or greater than 90°.

In addition to one or more of the features described above, or as an alternative, further embodiments of the method may include that the installation comprises integrally forming the inlet extension with the body of the tangential on-board injector.

In addition to one or more of the features described above, or as an alternative, further embodiments of the method may include forming a purge cavity configured along the body, the purge cavity configured such that large particles in an airflow through the body will enter the purge cavity.

In addition to one or more of the features described above, or as an alternative, further embodiments of the method may include configuring the purge cavity to expel particles from the purge cavity to an annular cavity external to the body.

In addition to one or more of the features described above, or as an alternative, further embodiments of the method may include forming a separator at an exit of the body, the separator configured to separate an airflow flowing through the body into a first flow path and a second flow path.

In another embodiment, a gas turbine engine is provided. The engine includes a tangential on-board injector having a body having an entrance and an exit, the body having a curved shape and defining an air passageway between the entrance and the exit and an inlet extension connected to the entrance of the body, the inlet extension extending from the body and having an inlet configured to force air to change direction when entering the inlet of the inlet extension.

In addition to one or more of the features described above, or as an alternative, further embodiments of the engine may include that the inlet extension is configured to direct air through an angle as the air flows through the inlet extension.

In addition to one or more of the features described above, or as an alternative, further embodiments of the engine may include a purge cavity configured along the air passageway of the body, the purge cavity configured such that large particles in an airflow through the passageway will enter the purge cavity.

In addition to one or more of the features described above, or as an alternative, further embodiments of the engine may include a separator located at the exit of the body, the separator configured to separate an airflow flowing through the air passageway into a first flow path and a second flow path.

Technical effects of embodiments of the present disclosure include an improved particle separation and air flow supply for a gas turbine engine. Further technical effects include an inlet extension configured at an inlet to a TOBI of a gas turbine engine. Further technical effects include a purge cavity within an air passage of a TOBI that is configured to enable purging particles from an airflow within the TOBI. Further technical effects include a separator configured at an outlet of a TOBI that is configured to enable separation of airflows that exit the TOBI prior to being supplied to various components of a gas turbine engine for cooling. Further technical effects include providing separate cooling air supplies to airfoils of a gas turbine engine with varying sizes of particles within the cooling air supplies.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 1A is a schematic illustration of a portion of a gas turbine engine having a tangential on-board injector ("TOBI") that may employ one or more embodiments described herein;

FIG. 1B is a baseline view of the TOBI of FIG. 1A;

FIG. 1C, shows a top-down view of two adjacent passageways of the TOBI of FIG. 1A;

FIG. 2A is a schematic illustration of a gas turbine engine in accordance with a non-limiting embodiment;

FIG. 2B shows a top-down view of the TOBI along the line B-B of FIG. 2A;

FIG. 2C is a partial schematic view of an exit end of the TOBI of FIG. 2A;

FIG. 3 is a schematic illustration of a gas turbine engine in accordance with another non-limiting embodiment of the disclosure;

FIG. 4 is an alternative schematic view of a non-limiting example of a purge cavity configuration in accordance with an embodiment of the disclosure;

FIG. 5A is an alternative schematic view of a non-limiting example of an inlet extension configuration in accordance with an embodiment of the disclosure;

FIG. 5B is an alternative schematic view of a non-limiting example of an inlet extension configuration in accordance with an embodiment of the disclosure;

FIG. 5C is an alternative schematic view of a non-limiting example of an inlet extension configuration in accordance with an embodiment of the disclosure;

FIG. 6 is a process flow for manufacturing a gas turbine engine in accordance with an embodiment of the disclosure; and FIG. 7 is a process flow of operating a gas turbine engine in accordance with an embodiment of the disclosure.

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A is a schematic illustration of a portion of a gas turbine engine having a tangential on-board injector ("TOBI"). During operation, air discharging from the TOBI is delivered into a cavity just ahead of the turbine. The cavity is typically sealed off by one or more seals that interface between the rotating and non-rotating structure of the gas turbine engine. Air may escape or pass through the one or more seals in the form of leakage.

The arrows in FIG. 1A illustrate a cooling air flow discharging from the TOBI and distributed around and through a turbine portion of the gas turbine engine. As shown, a turbine 100 (partially shown) comprises a disk 102 supporting a plurality of circumferentially spaced blades 104 (one being shown). A first seal 106 and a second seal 108 are configured to define an annular cavity 110 just ahead of the turbine 100. A body 112 of a TOBI defines an annular passageway 114 that is configured to receive compressor discharge air and deliver it to the turbine rotor through a plurality of nozzles 116. The body 112 has an entrance 115 and an exit 117, with the nozzles 116 configured at the exit 117 of the body 112.

FIG. 1B is a baseline view of the TOBI of FIG. 1A. As shown, a plurality of entrances 115 may be formed in the body 112 of the TOBI. Although shown with entrances 115 covering 180° of the body 112 of the TOBI, those of skill in the art will appreciate that entrances 115 may cover the full 360° of the body of the TOBI, or other configurations may be employed. FIG. 1C, shows a top-down view of two adjacent passageways 114 of the TOBI.

Sand, dust, and other particles may collect at each entrance 115 to the TOBI, such as at area 118 shown in FIG. 1A. The particles may thus interfere with the operation of the gas turbine engine. For example, particles may settle at area 118 when the engine is shut down, and then the particles that settle or collect at area 118 may be sucked into the TOBI during a start-up operation.

Turning now to FIG. 2A, a schematic illustration of a gas turbine engine in accordance with a non-limiting embodiment is shown. In FIG. 2A, a turbine 200 (partially shown) comprises a disk 202 supporting a plurality of circumferentially spaced blades 204 (one being shown). A first seal 206 and a second seal 208 are configured to define an annular cavity 210 just ahead of the turbine 200. A body 212 of a TOBI defines a passageway 214 that is configured to receive compressor discharge air and deliver it to the turbine rotor through a plurality of nozzles. The body 212 has an entrance 215 and an exit 217 configured to allow air to flow through the passageway 214 of the TOBI.

As shown in FIG. 2A, the entrance 215 to the body 212 may include an inlet extension 220 having an inlet 222 attached thereto. The inlet extension 220 may be attached by fasteners, welding, etc. to the body or may be integrally formed with the body 212. The inlet extension 220 may be configured, positioned, or angled such that air that flows from the compressor must turn to enter the inlet extension 220 through the inlet 222. As such, for example, when an engine is shut off, the particles may collect in area 218 around a wall of the inlet extension 220, and upon startup the particles may not be pulled into the passageway 214 of the body 212. This is because the inlet extension 220 may provide a wall or other solid structure that will not allow the particles to pass therethrough. The inlet extension 220 is raised from the bottom of the inner case 211 and angled or facing away from the flow.

Further, during operation, air will have to make a complete turn to enter the inlet 222. As such, large particles may not be able to remain within the air flow, and thus may fall to area 218 around a wall of the inlet extension 220 without entering the inlet 222. That is, the inlet extension 220 may be configured to prevent particles from entering the passageway 214 of the TOBI both during operation and when the engine is not operational. In accordance with some non-limiting embodiments, the inlet extension 220 may be configured to filter out the largest particles such that they do not enter the passageway 214 of the TOBI.

Figure 2A:
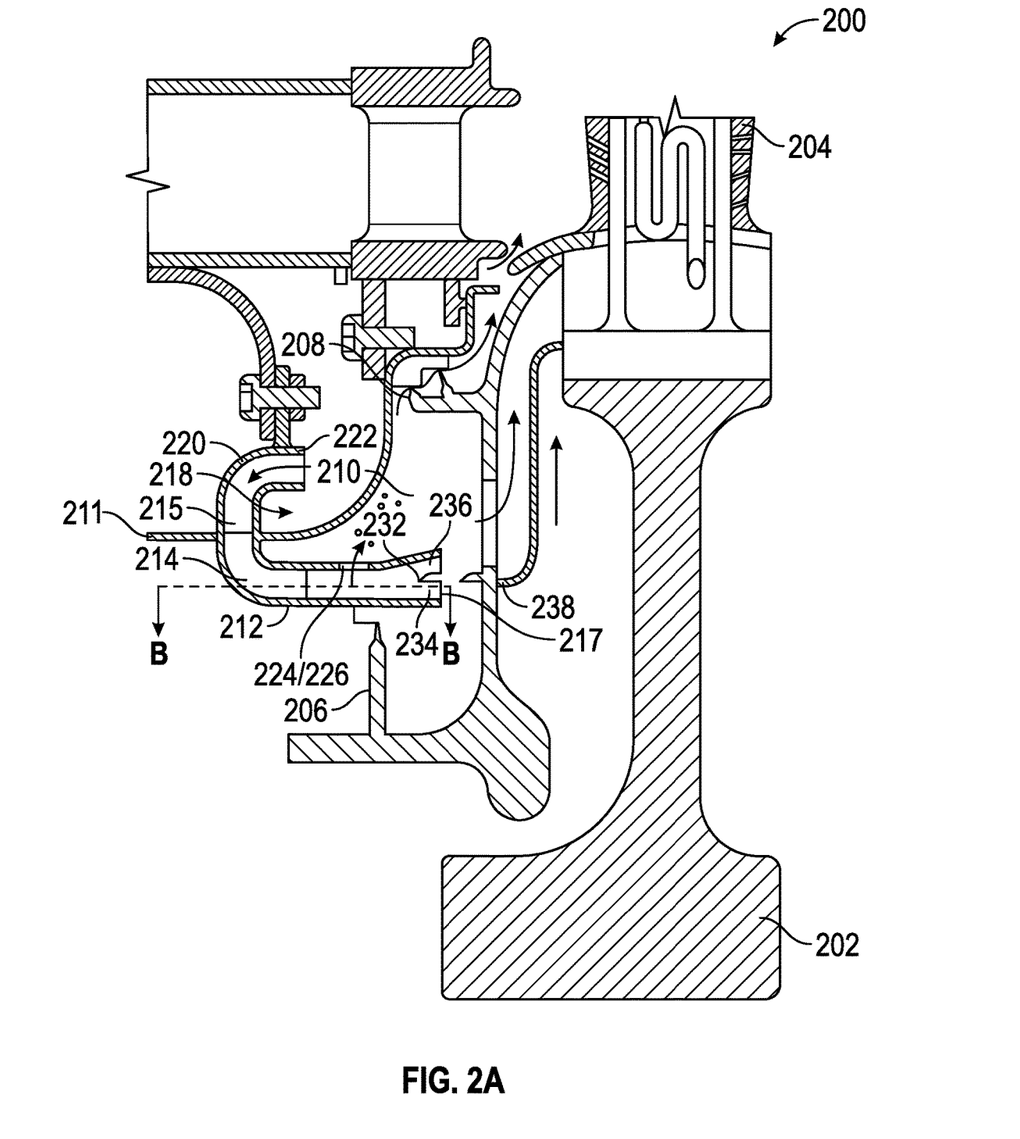

As shown in FIG. 2A, the body 212 of the TOBI may also include a purge mechanism 224. Purge mechanism 224 may be a cavity or channel, or other configuration that is configured to allow particles to enter the purge mechanism 224 and have the particles then be purged therefrom. In FIG. 2A, an arrow is shown extending upward from the body 212 through a purge port 226. The purge port 226 may be a hole or aperture in a wall of the body 212 such that the particles may pass from the passageway 214 within the body 212 into the annular cavity 210. The particles may be evacuated from the purge mechanism 224 because the pressure in the annular cavity 210 may be lower than the pressure within the passageway 214 of the body 212. The pressure differential may be sufficient to urge the particles out of the purge mechanism 224 and into the annular cavity 210. The particles may then flow out of the annular cavity 210 through the second seal 208, as indicated by the flow arrows. This air may be fed to the forward rim cavity.

Figure 2B:
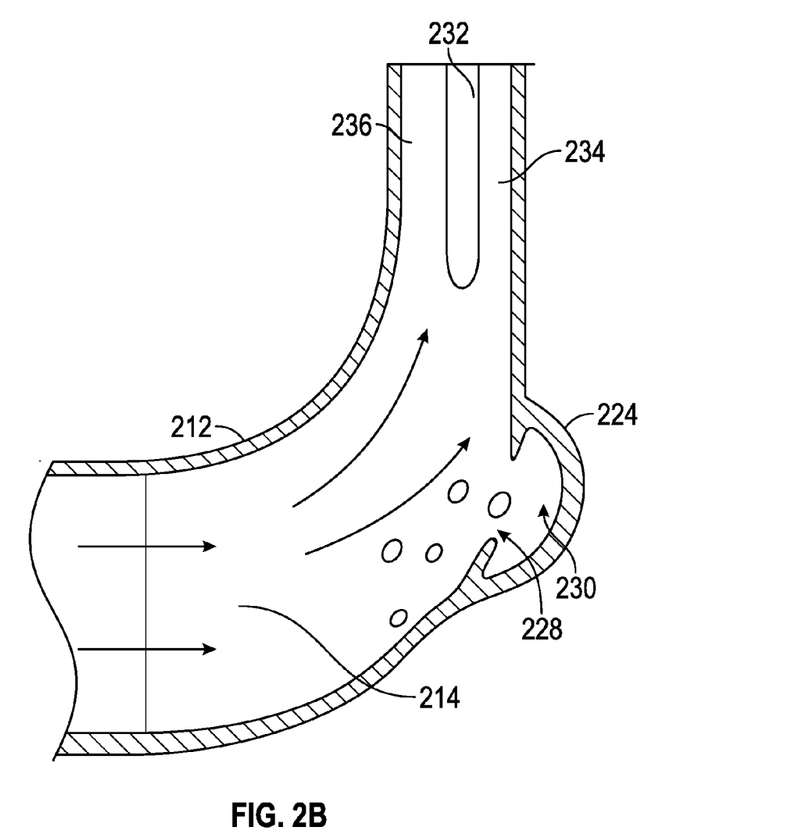

FIG. 2B shows a top-down view of the TOBI along the line B-B of FIG. 2A. As shown, the purge mechanism 224 is configured on an outer curve radius of the body 212. That is, as shown by the arrows, the air flow will travel toward the right on the page, and then upward. As the air flow makes the turn within the passageway 214 of the TOBI, particles may have sufficient weight/size combination that they cannot make the turn and move to the outer curved wall of the body 212 of the TOBI. The particles may pass through a purge cavity entry 228 and into a purge cavity 230. The purge cavity entry 228 may be a hole in the wall of the TOBI, and allow fluid communication between the passageway 214 and the purge cavity 230. When the particles are within the purge cavity 230, the pressure differential between the passageway 214 and the annular cavity 210 will force the particles to flow into the annular cavity 210.

Referring again to FIG. 2B, after passing the purge mechanism 224, the air flow within the passageway 214 may be further separated by a separator 232. The separator 232 may be a fin, blade, or other device or structure that is configured to separate the airflow in the TOBI into a first flow path 234 and a second flow path 236. The first flow path 234 may be adjacent to the outer wall of the body 212 and may follow the purge mechanism 224 along the flow path. Particles that remain in the airflow after passing the purge mechanism 224 may flow into the first flow path 234. The air from the first flow path 234 may then flow toward the turbine 200 around a divider 238 and into portions of the blade 204. This air may be used to cool portions of the blade that have holes and passages of sufficient size to accommodate some particles.

The air that passes through the second flow path 236 may be the cleanest air, with the largest particles filtered out by the inlet extension 220, the medium particles filtered out by the purge mechanism 224, and the small particles filtered out by the separator and the first flow path 234. This air may flow on an interior side of the divider 238 and be supplied to the portions of the turbine 200 that have the smallest holes.

Figure 2C:
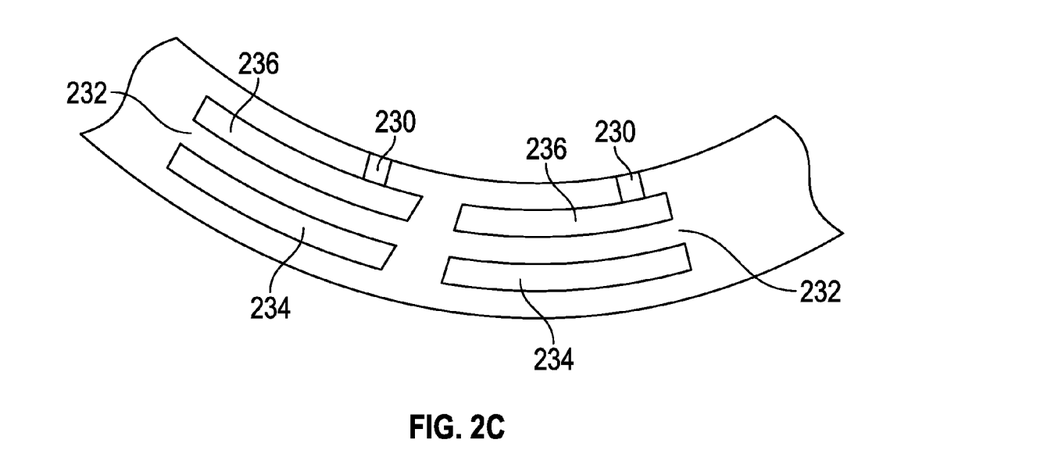

In some embodiments, the air that passes through the first flow path 234 may be referred to as inboard air and the air that passes through the second flow path 236 may be referred to as outboard air. In some embodiments, the separator 232 may be configured to have the first flow path 234 be angled downward and the second flow path 236 may be angled upward. This is shown, for example, in FIG. 2C, which shows a partial schematic view of the exit end of the TOBI, with two sets of exit paths from two separate passages 214 shown. As depicted, the first flow path 234 and the second flow path 236 are physically separated by the separator 232. Also shown in FIG. 2C is the purge cavity 230 that is configured to expunge particles prior to reaching the first flow path 234 and the second flow path 236.

Figure 3:
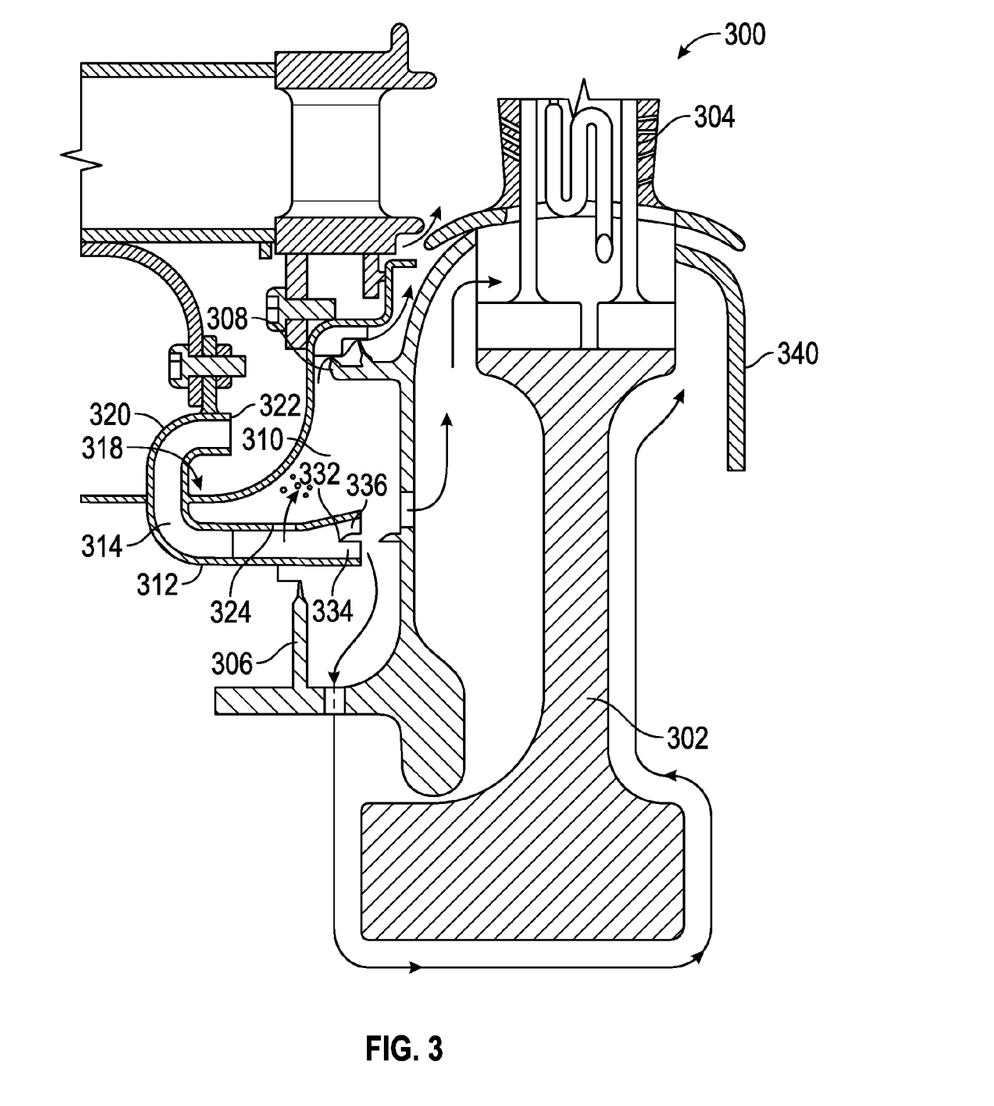

Turning now to FIG. 3, a schematic illustration of a gas turbine engine in accordance with another non-limiting embodiment is shown. In FIG. 3, a turbine 300 (partially shown) comprises a disk 302 supporting a plurality of circumferentially spaced blades 304 (one being shown). A first seal 306 and a second seal 308 are configured to define an annular cavity 310 just ahead of the turbine 300. A TOBI 312 defines a passageway 314 that is configured to receive compressor discharge air and deliver it to the turbine rotor through a plurality of nozzles. Similar to the embodiment shown and described with respect to FIGS. 2A and 2B, the TOBI 312 includes an inlet extension 320 defining an inlet 322 and with an area 318 formed below the inlet extension 320 and configured to collect particles. The TOBI 312, as shown, also includes a purge mechanism 324 and a separator 332.

The primary difference between the configuration of FIG. 3 and that previously described is the airflow as it leaves the TOBI 312. As shown, a first flow path 334 may direct airflow downward after the air leaves the first flow path 334 of the TOBI 312. The air may flow from the first flow path 334 downward and around the disk 302 as shown by the flow arrow in FIG. 3. The air may be directed toward the trailing edge of the blade 304 by a deflector 340. The deflector 340 may be a plate or other type of cover or component.

The air from the second flow path 336 may be similar to that shown and described above. That is, the air from the second flow path 336 may flow toward the turbine 300 and then into portions of the blade 304 to provide cooling thereto.

Figure 4:
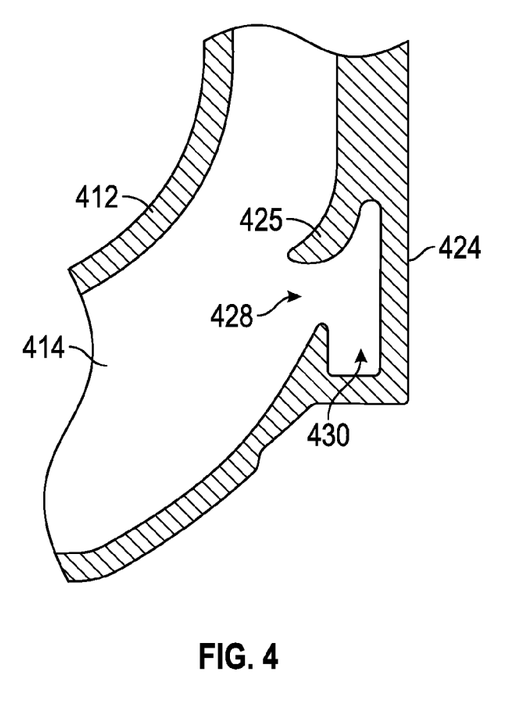

Turning now to FIG. 4, an alternative non-limiting example of the purge cavity configuration is shown. FIG. 4 shows a top-down view of a TOBI having an alternatively configured purge mechanism 424 configured on an outer curve radius of the body 412. Similar to that described above, the air flow will travel toward the right on the page, and then upward. As the air flow makes the turn within the passageway 414 of the TOBI, particles may have sufficient weight/size combination that they cannot make the turn and move to the outer curved wall of the body 412 of the TOBI. The particles may pass through a purge cavity entry 428 and into a purge cavity 430. The purge cavity entry 428 may be a hole in the wall of the TOBI, and allow fluid communication between the passageway 414 and the purge cavity 430. When the particles are within the purge cavity 430, the pressure differential between the passageway 414 and an annular cavity will force the particles to flow into the annular cavity, as described above. In this embodiment, the purge cavity includes a protrusion 425. The protrusion 425 may be a lip or other extension at the purge cavity entry 428 that is configured to aid in capturing large particles that pass through the passageway 414. Also shown in FIG. 4 is an alternative geometry of the purge cavity 430. In this embodiment, the purge cavity 430 is squared shape, wherein in FIG. 2B the purge cavity 230 has a rounded shape. As will be appreciated by those of skill in the art, the purge cavity may take any desired configuration, shape, or geometry, without departing from the scope of the present disclosure.

Figure 5A:
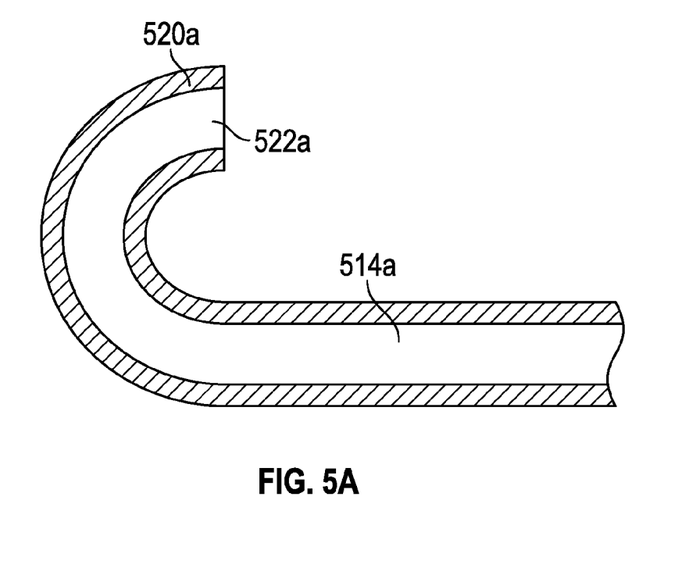
Figure 5B:
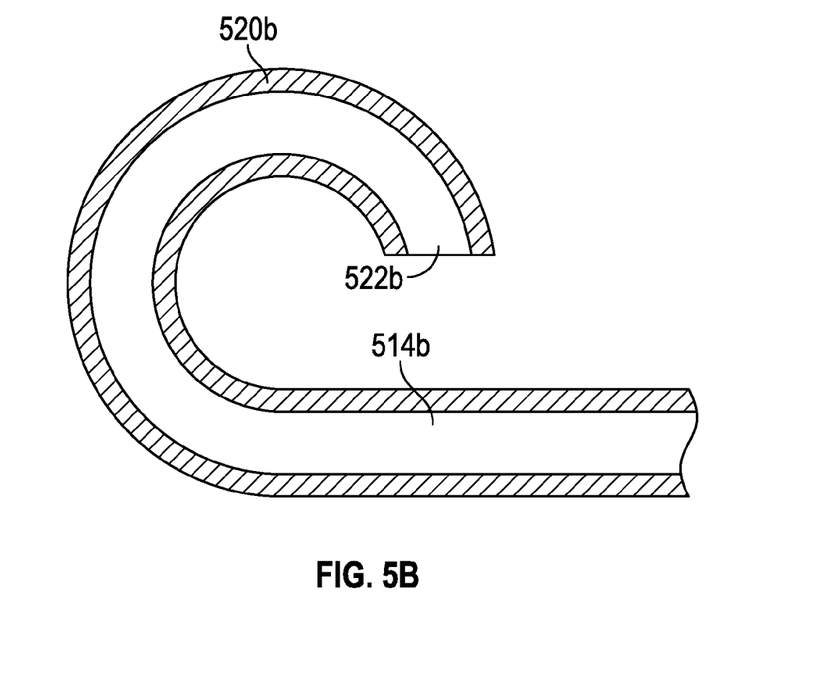
Figure 5C:
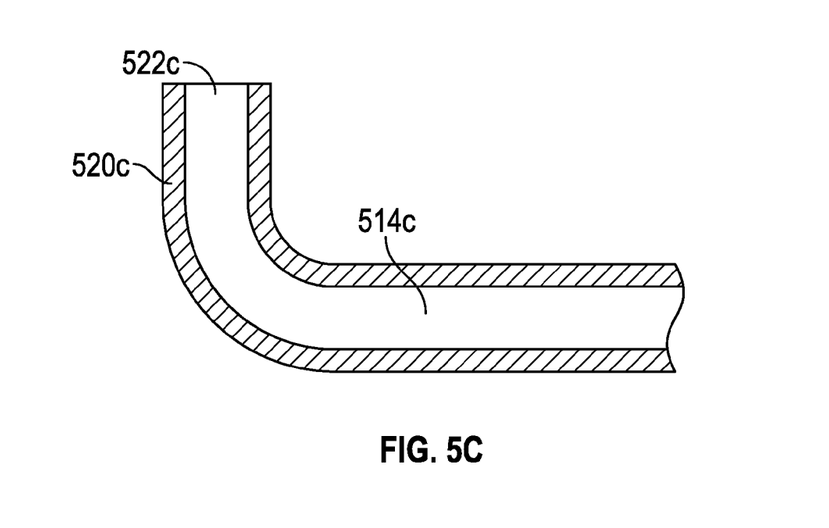

Turning now to FIGS. 5A-5C, alternative non-limiting configurations of the inlet extension are shown. In FIG. 5A, the inlet extension 520a may be configured to extend 180° from the direction of flow through the passageway 514a. That is, an inlet 522a of the inlet extension 520a may be configured to force air that flows into the passageway 514a of the TOBI to change air flow direction by 180° when flowing into and through the TOBI.

In FIG. 5B, the inlet extension 520b may be configured to extend 270° from the direction of flow through the passageway 514b. That is, an inlet 522b of the inlet extension 520b may be configured to force air that flows into the passageway 514b of the TOBI to change air flow direction by 180° when flowing into and through the TOBI.

In FIG. 5C, the inlet extension 520c may be configured to extend 90° from the direction of flow through the passageway 514c. That is, an inlet 522c of the inlet extension 520c may be configured to force air that flows into the passageway 514c of the TOBI to change air flow direction by 90° when flowing into and through the TOBI.

Figure 1A:
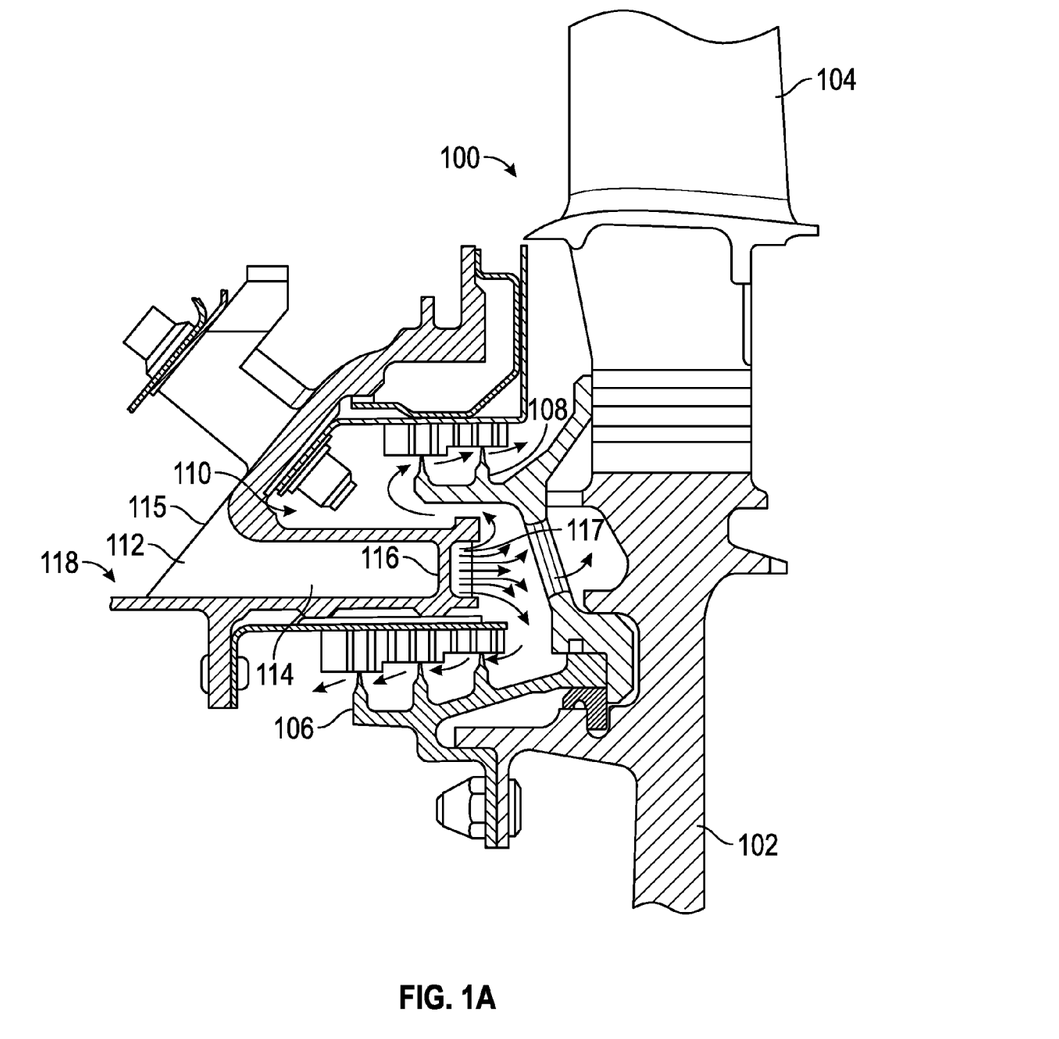
Figure 1B:
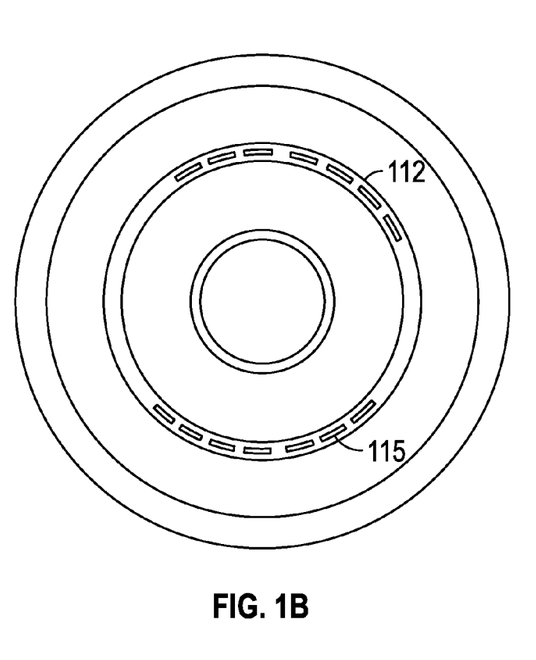
Figure 1C:
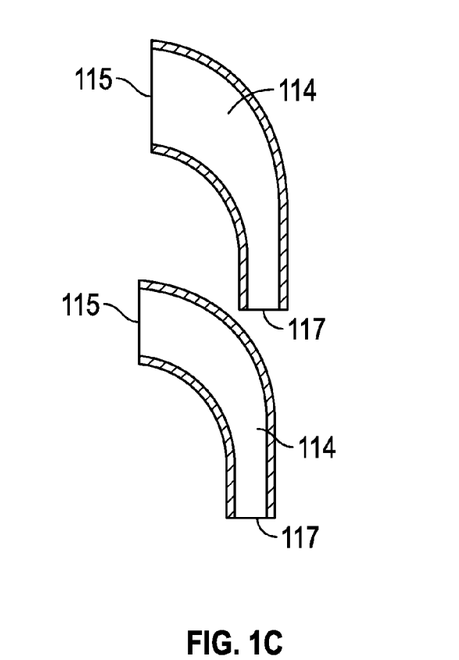

As will be appreciated by those of skill in the art, the change in flow direction and configuration of the inlet extension may be configured at any desired angle. For example, in a single system different inlet extensions about the 360° of the TOBI (see, e.g., FIG. 1B) may have different angles and/or configurations, such that particles may be prevented from entering the passageway of the specific portion of the TOBI.

Figure 6:
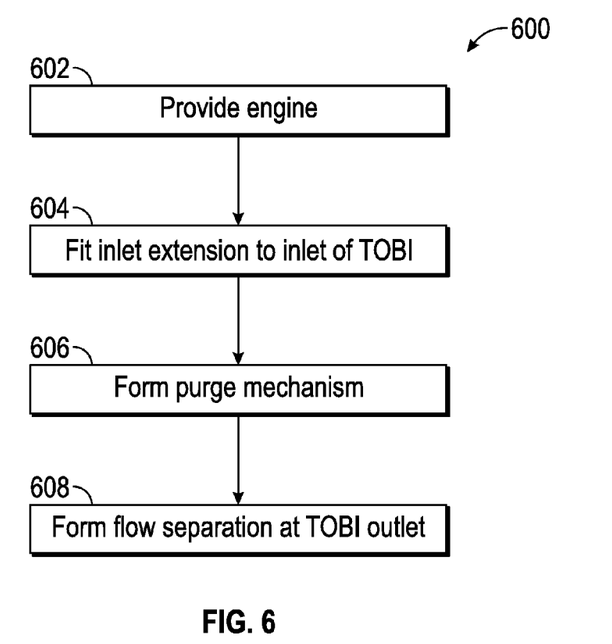

Turning now to FIG. 6, a process flow for manufacturing a gas turbine engine in accordance with an embodiment is shown. Process 600 may be performed during a manufacturing of a gas turbine engine or may be performed to retrofit a gas turbine engine with features described herein. As such, a gas turbine engine, or a portion thereof, may be provided (block 602). The gas turbine engine may be fitted with an inlet extension at the TOBI (block 604). The inlet extension may take the form of any of the above described embodiments or variations thereof. In some embodiments, the fitting of the inlet extension may be to fit a flow path extension to the inlet of a TOBI such that the extension is directed in the direction of the flow path of air in the engine and an inlet to the extension is oriented in a direction opposing the airflow so that air flowing into the inlet must change direction when flowing into the inlet extension. The inlet extension may be configured to filter or separate particles from entering the inlet of the TOBI and further may be configured to prevent particles from falling into the TOBI by the force of gravity.

A purge mechanism may be formed in or on the TOBI (block 606). The purge mechanism may be configured on an outer curve of the TOBI such that particles may be captured in a cavity of the purge mechanism and then be evacuated from the purge cavity. Finally, a flow separator may be formed at an exit of the TOBI to separate airflow as it exits the TOBI (block 608). The separator may be configured to have particles in the air at the exit of the TOBI to flow in a different path from air that does not contain particles.

Those of skill in the art will appreciate that the flow process 600 may be modified without departing from the scope of the present disclosure. For example, the TOBI may be pre-fabricated with the purge mechanism and the separator, and then installed into the engine. Furthermore, in some embodiments, the inlet extension may be formed as part of the TOBI and installed therewith. In some embodiments, all of the blocks 602-608 may be performed simultaneously, such as in an additive manufacturing process. In some embodiments, the engine may already have a TOBI (with or without the purge mechanism and/or the separator) and the inlet extension may be retrofit or installed on the engine. Thus, the process order of the blocks 602-608 is not limiting.

Figure 7:
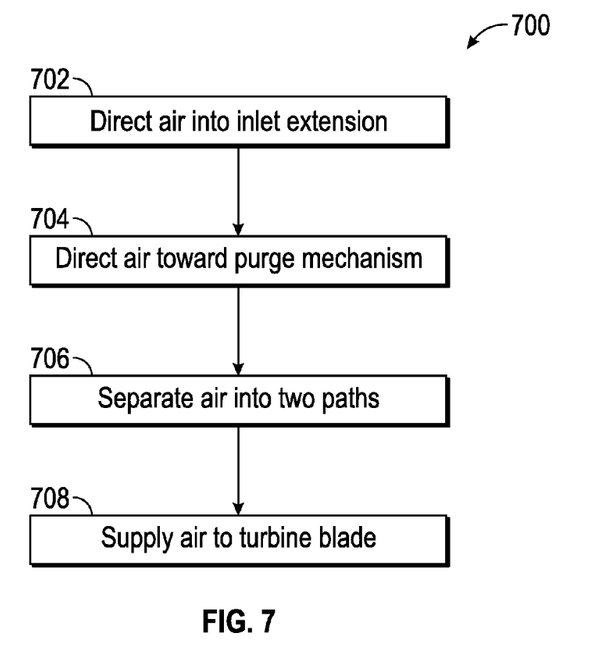

Turning now to FIG. 7, a process flow of operating a gas turbine engine is shown. Process 700 may be operated with a gas turbine engine having a TOBI configuration with an inlet extension, a purge mechanism, and a separator at the outlet or exit of the TOBI. The flow process 700 may be viewed as a conveyance of air through a portion of a gas turbine engine.

First, air may be directed to flow in a reverse direction when entering an inlet extension of the TOBI (block 702). As the air is redirected in a reverse flow, large particles may not be able to enter the TOBI and may fall and collect below the inlet extension. Next, the air may be passed into the TOBI and toward a purge mechanism at a curve or turn within the TOBI (block 704). As particles in the air attempt to turn within the TOBI they will move to the exterior or external radius of the curve, and may be captured in a purge cavity of the purge mechanism. The particles in the purge mechanism may then be forced from the purge cavity. The air may then be separated into first and second flow paths (block 706). For example, a first flow path may be configured in a downward direction, relative to the TOBI, such that particles in the air leaving the TOBI may flow in the first flow path and be directed to particular portions of a turbine blade (block 708). In some embodiments the first flow path may provide air to portions of the blade that require cooling but have holes or pathways that are sufficiently large to accommodate some particles. The second flow path may be configured to direct air with little to no particles and/or particles that are very fine to portions of a blade that require cooling have very small holes or pathways (block 708).

Advantageously, embodiments described herein provide mechanisms and processes for filtering particles from airflow as it passes through a TOBI prior to being supplied for cooling an airfoil. Further, advantageously, particles of large size may be filtered by an inlet extension configuration at the inlet side of a TOBI such that the particles cannot enter the inlet extension and thus cannot enter the TOBI. Further, advantageously, the configuration of the TOBI inlet extension may be such that large particles may collect below and/or away from the inlet of the TOBI such that upon start up, the large particles will not be forced into the TOBI.

Further, advantageously, embodiments described herein provide a purging mechanism that is configured to filter particles out of the TOBI as the particles pass through the TOBI. Advantageously, as the air flows into the TOBI and around a curve, the particles are forced to the exterior radius of the curve and may be captured in a purge cavity. The particles may then be evacuated from the purge cavity due to a pressure differential between air in the TOBI and air in a cavity external to the TOBI.

Moreover, advantageously, embodiments described herein provide an air flow separator at an exit of a TOBI to separate the airflow into two flow paths. A first flow path may be configured to carry small particles in the first flow path and then direct the flow to portions of a turbine that may accommodate small particles in the airflow. A second flow path may be provided with low particle content (e.g., small number of particles and/or fine particle size) to portions of a turbine that may require cooling but may not be able to accommodate high quantities and/or sizes of particles in the cooling air.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although shown and described with various embodiments having an inlet extension, a purge mechanism, and a separator, those of skill in the art will appreciate that in other embodiment only one or two of the features may be provided, without departing from the scope of the present disclosure. For example, a gas turbine engine may be configured with an inlet extension but may not include a purge mechanism or a separator. Further, although described with respect to turbine blades, those of skill in the art will appreciate that the airflow may be used to cool vanes or other airfoils.

Accordingly, the present disclosure is not to be seen as limited by the foregoing description, but is only limited by the scope of the appended claims.

What is claimed is:

1. A tangential on-board injector for a gas turbine engine, the tangential on-board injector comprising:

a tangential on-board injector body having an entrance and an exit, the tangential on-board injector body having a curved shape and defining an air passageway between the entrance and the exit; and an inlet extension connected to the entrance of the tangential on-board injector body such that that air passageway of the tangential on-board injector extends through an inner case of the gas turbine engine, the inlet extension extending from the tangential on-board injector body and having an inlet configured to force air to change direction when entering the inlet of the inlet extension such that the air must turn to enter the inlet extension, wherein the inlet extension, when installed in the gas turbine engine, is raised from a bottom of the inner case and angled or facing away from a direction of flow through the inner case, and defines a wall that prevents particles from entering the entrance of the tangential on-board injector body, wherein the wall of the inlet extension defines an area external to and around the inlet extension where particles collect around the wall and said wall prevents the particles in the defined area from entering the air passageway of the tangential on-board injector body, wherein the wall of the inlet extension defines an area external to and around the inlet extension where particles collect around the wall and said wall prevents the particles in the defined area from entering the air passageway of the tangential on-board injector body, wherein the inlet extension is arranged on a first side of the inner case and the tangential on-board injector body is arranged on a second side of the inner case, wherein the inlet extension is configured to direct air through an angle that is equal to or greater than 90° as the air flows through the inlet extension.

2. The tangential on-board injector of claim 1, wherein the inlet extension is integrally formed with the tangential on-board injector body.

3. The tangential on-board injector of claim 1, further comprising a purge cavity configured along the air passageway of the tangential on-board injector body, the purge cavity configured such that large particles in an airflow through the passageway will enter the purge cavity.

4. The tangential on-board injector of claim 3, wherein the purge cavity is configured to expel particles from the purge cavity to an annular cavity external to the tangential on-board injector body.

5. The tangential on-board injector of claim 1, further comprising a separator located at the exit of the tangential on-board injector body, the separator configured to separate an airflow flowing through the air passageway into a first flow path and a second flow path.

6. The tangential on-board injector of claim 5, wherein the first flow path is directed inboard relative to the tangential on-board injector body and the second flow path is directed outboard relative to the tangential on-board injector body.

7. A gas turbine engine comprising:

at least one turbine disk;

an inner case; and a tangential on-board injector arranged between the inner case and the at least one turbine disk to discharge air into a cavity upstream of the at least one turbine disk, the tangential on-board injector having:

a tangential on-board injector body having an entrance and an exit, the tangential on-board injector body having a curved shape and defining an air passageway between the entrance and the exit, wherein the entrance is formed in the inner case; and an inlet extension connected to the entrance of the tangential on-board injector body such that that air passageway of the tangential on-board injector extends through the inner case of the gas turbine engine, the inlet extension extending from the tangential on-board injector body and having an inlet configured to force air to change direction when entering the inlet of the inlet extension such that the air must turn to enter the inlet extension, wherein the inlet extension is arranged on a first side of the inner case and the tangential on-board injector body is arranged on a second side of the inner case, and wherein the inlet extension is raised from the inner case and angled or facing away from a direction of flow through the inner case and includes a wall that defines an area external to and around the wall, the wall preventing particles located in the defined area from entering the entrance of the tangential on-board injector body, wherein the inlet extension is configured to direct air through an angle that is equal to or greater than 90° as the air flows through the inlet extension.

8. The gas turbine engine of claim 7, further comprising a purge cavity configured along the air passageway of the tangential on-board injector body, the purge cavity configured such that large particles in an airflow through the passageway will enter the purge cavity.

9. The gas turbine engine of claim 8, wherein the purge cavity is configured to expel particles from the purge cavity to an annular cavity external to the tangential on-board injector body.

10. The gas turbine engine of claim 7, further comprising a separator located at the exit of the tangential on-board injector body, the separator configured to separate an airflow flowing through the air passageway into a first flow path and a second flow path.

11. The gas turbine engine of claim 10, wherein each of the first flow path and the second flow path are configured to direct air to cool components of the gas turbine engine.

12. The tangential on-board injector of claim 10, wherein the first flow path is directed inboard relative to the tangential on-board injector body and the second flow path is directed outboard relative to the tangential on-board injector body.

13. The gas turbine engine of claim 7, wherein the inlet extension is integrally formed with the tangential on-board injector body.

* * * * *